US012325615B2

(12) United States Patent
Zeng

(10) Patent No.: US 12,325,615 B2
(45) Date of Patent: Jun. 10, 2025

(54) MULTIFUNCTIONAL STROBE LIGHT FOR FORKLIFT

(71) Applicant: ANYTREK CORPORATION, Westlake Village, CA (US)

(72) Inventor: Haijian Zeng, Rancho Cucamonga, CA (US)

(73) Assignee: ANYTREK CORPORATION, Westlake Village, CA (US)

( * ) Notice: Subject to any disclaimer, the term of this patent is extended or adjusted under 35 U.S.C. 154(b) by 112 days.

(21) Appl. No.: 18/461,963

(22) Filed: Sep. 6, 2023

(65) Prior Publication Data

US 2025/0074754 A1 Mar. 6, 2025

(51) Int. Cl.
*B66F 9/075* (2006.01)
*B66F 17/00* (2006.01)

(52) U.S. Cl.
CPC .......... *B66F 9/0755* (2013.01); *B66F 17/003* (2013.01)

(58) Field of Classification Search
CPC ............................. B66F 9/0755; B66F 17/003
See application file for complete search history.

(56) References Cited

U.S. PATENT DOCUMENTS

| | | | | |
|---|---|---|---|---|
| 4,769,700 | A * | 9/1988 | Pryor | A01B 69/008 348/120 |
| 2007/0163843 | A1* | 7/2007 | Tyree | B66F 9/142 187/237 |
| 2011/0010023 | A1* | 1/2011 | Kunzig | G01S 5/16 701/2 |
| 2012/0060383 | A1* | 3/2012 | Goddard | B66F 9/0755 33/299 |
| 2018/0079636 | A1* | 3/2018 | Dixon | B66F 9/07 |
| 2020/0031646 | A1* | 1/2020 | Eiler | G08B 3/06 |
| 2023/0139590 | A1* | 5/2023 | Wilson | G05B 19/042 700/28 |

* cited by examiner

*Primary Examiner* — Thomas D Alunkal
(74) *Attorney, Agent, or Firm* — DANE IP Law PC

(57) ABSTRACT

A multifunctional strobe light that may be used with a forklift, and related methods, are disclosed. The multifunctional strobe light may have one or more cameras for video recording and determining whether the forklift is about to get into a collision. If the multifunctional strobe light determines that the forklift is about to get into a collision, then the strobe light may produce audible and/or visual warning signs to put the operator of the forklift and others around the forklift on notice. The multifunctional strobe light may be designed to video record the entire surrounding of the forklift and also recognize the type of nearby objects. The multifunctional strobe light may also determine whether the operator has completed pre-requisite tasks before operating the forklift.

15 Claims, 6 Drawing Sheets

MULTIFUNCTIONAL STROBE LIGHT FOR FORKLIFT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to a multifunctional strobe light and a method of using thereof.

Conventional strobe lights may be used with forklifts to provide a visual sign for others that the forklift is being operated to put them on notice. However, conventional strobe lights have certain deficiencies.

Accordingly, there is a need in the art for an improved device, system, and method for utilizing strobe lights with forklifts.

BRIEF SUMMARY

The various embodiments and aspects disclosed herein address the needs discussed above, discussed below and those that are known in the art.

A multifunctional strobe light that may be used with a forklift, and related methods, are disclosed. The multifunctional strobe light may have one or more cameras for video recording and determining whether the forklift is about to get into a collision. If the multifunctional strobe light determines that the forklift is about to get into a collision, then the strobe light may produce audible and/or visual warning signs to put the operator of the forklift and others around the forklift on notice of the impending danger. The multifunctional strobe light may be designed to video record the entire surrounding of the forklift and also recognize the type of nearby objects. The multifunctional strobe light may also determine whether the operator has completed pre-requisite tasks before operating the forklift. If the forklift hits an object, the multifunctional strobe light may sense such collision and collect data regarding the incident to transmit to a server.

More particularly, a multifunctional strobe light is disclosed. The multifunctional strobe light may have a strobe light mechanism having a strobe light lens covering a plurality of LED lights circling around the multifunctional strobe light. The multifunctional strobe light may have a housing body attached to the strobe light mechanism for housing electrical components, the housing body having one or more camera apertures for receiving a corresponding a camera. By way of example and not, the housing body may have a front camera aperture and a rear camera aperture. The electrical components of the multifunctional strobe light may include a printed circuit board with a processor and a memory unit attached, a camera facing each of the camera apertures (e.g., a front camera facing the front camera aperture, and a rear camera facing the rear camera aperture), and a speaker device electrically connected to the processor.

In some embodiments, the housing body may have a first side camera aperture and a second side camera aperture, and the electrical components further include a first side camera facing the first side camera aperture and a second side camera facing the second side camera aperture. In some embodiments, the front camera, the rear camera, and the first and second side cameras may be configured to panoramically video record a surrounding environment of the multifunctional strobe light.

In some embodiments, the electrical components of the multifunctional strobe light may further include a shock sensor electrically connected to the processor. In some embodiments, the electrical components of the multifunctional strobe light may further include an accelerometer electrically connected to the processor. In some embodiments, the electrical components of the multifunctional strobe light may further include a GPS tracking device electrically connected to the processor. In some embodiments, the multifunctional strobe light may be attachable to a forklift.

In some embodiments, the multifunctional strobe light may have a Wi-Fi antenna within the housing body to access a server and archive video recordings of the cameras. In some embodiments, the processor of the multifunctional strobe light may be configured to detect an object and determine a distance of an object from the multifunctional strobe light using a real-time video recording of one or more of the front and rear cameras. By way of example and not limitation, stereo vision or multiple 2 dimensional screen shots of objects from the camera may be used to estimate a distance from the strobe light to the object. The program may be adjusted to provide an alarm (e.g., sound, visual, haptic) to the driver and others around the fork lift when the object comes within a certain distance (e.g., 10 feet) to mitigate the fork lift from hitting the object. In some embodiments, the processor of the multifunctional strobe light may be configured to control the speaker device to output a warning sound when the object passes a threshold distance measured relative to the multifunctional strobe light.

Additionally, a method of providing pre-collision warnings using a multifunctional strobe light of a forklift is disclosed. The method may include real-time recording a surrounding environment using one or more cameras of the multifunctional strobe light, processing the real-time recording of the one or more cameras to recognize a nearby object and determine a distance of the nearby object relative to the multifunctional strobe light using a processing unit of the multifunctional strobe light, determining whether the distance of the nearby object is less than a threshold distance that is indicative of a possible collision using the processing unit of the multifunctional strobe light, and if the distance of the nearby object is less than the threshold distance, generating one or more warning signals using the multifunctional strobe light that alerts a driver of the forklift.

In some embodiments, the one or more warning signals may be an audible sound produced by the multifunctional strobe light. In some embodiments, the one or more warning signals may also be a change in a lighting pattern of the multifunctional strobe light.

In some embodiments, the real-time recording of the one or more cameras may be stored in a memory unit of the multifunctional strobe light. In some embodiments, the real-time recording of the one or more cameras may be stored in a memory unit of the multifunctional strobe light when the distance of the nearby object becomes less than the threshold distance.

In some embodiments, the method may further include tracking the location of the forklift using a GPS tracking device of the multifunctional strobe light. In some embodiments, the method may further include determining whether an impact has occurred using a shock sensor of the multi-functional strobe light that is electrically coupled to the processor. In some embodiments, the method may further include determining whether an impact has occurred using a accelerometer of the multifunctional strobe light that is electrically coupled to the processor.

In some embodiments, where recognizing the nearby object by the processor may determine a type of object that the nearby object falls under. In some embodiments, the multifunctional strobe light may be attached to a roof of a cab frame of the forklift.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
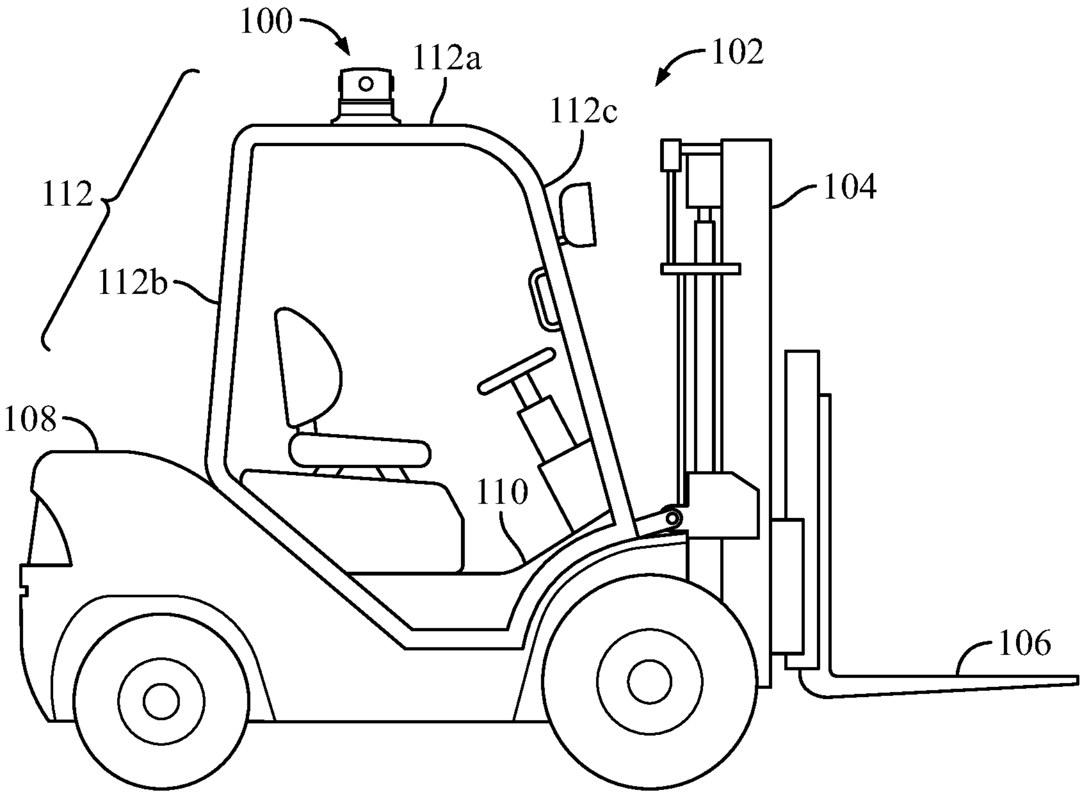
FIG. 1 shows a side view of a forklift having a multi-functional strobe light.
Figure 2:
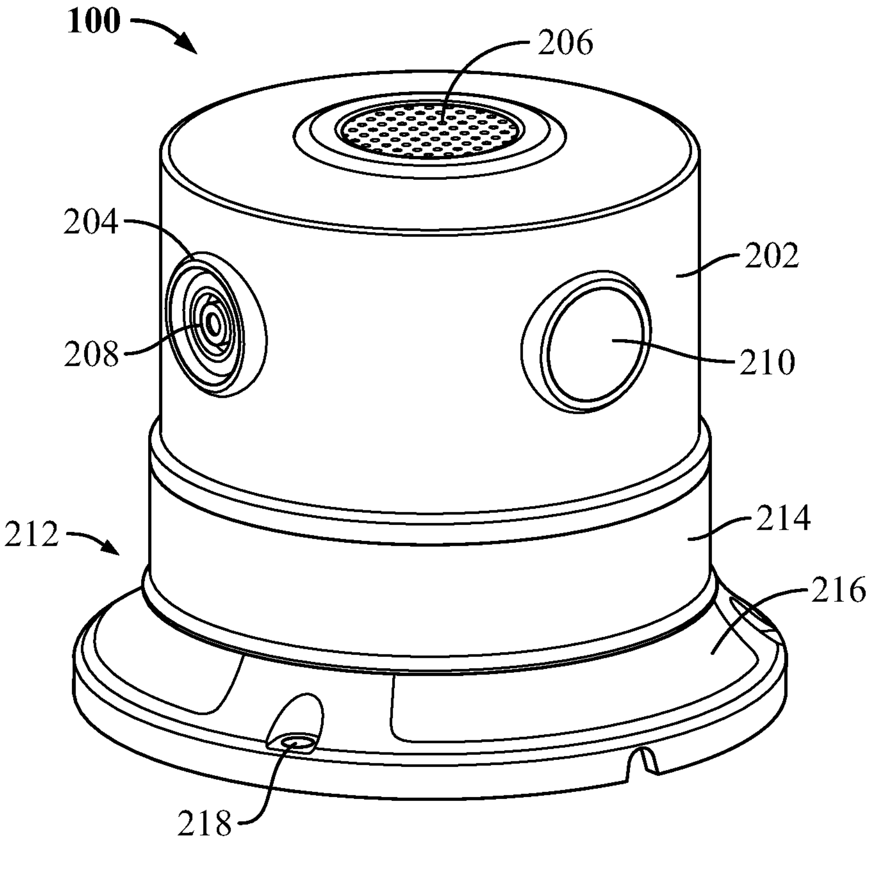
FIG. 2 shows a perspective view of the multifunctional strobe light.
Figure 3:
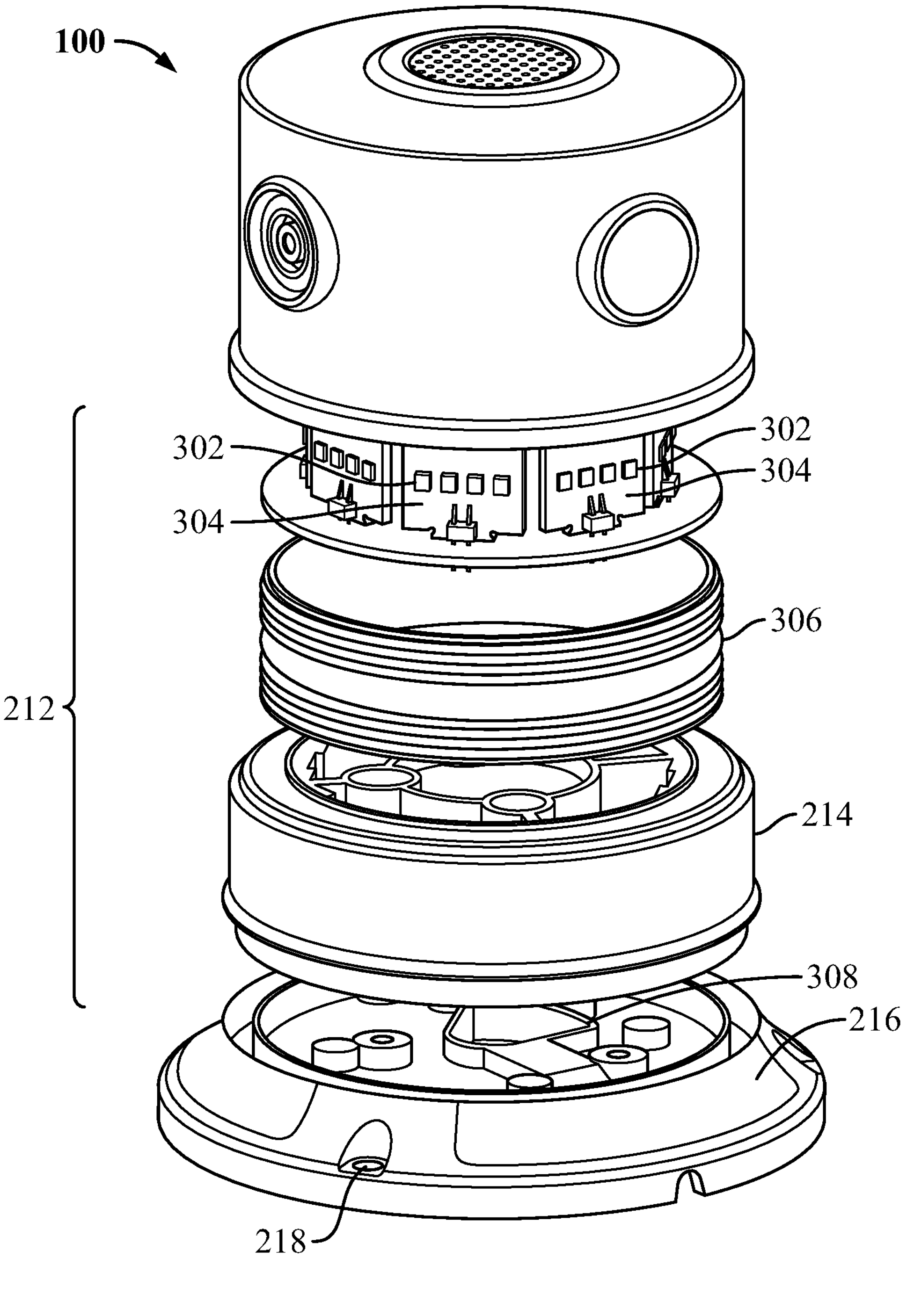
FIG. 3 shows a first semi-exploded view of the multi-functional strobe light.
Figure 4:
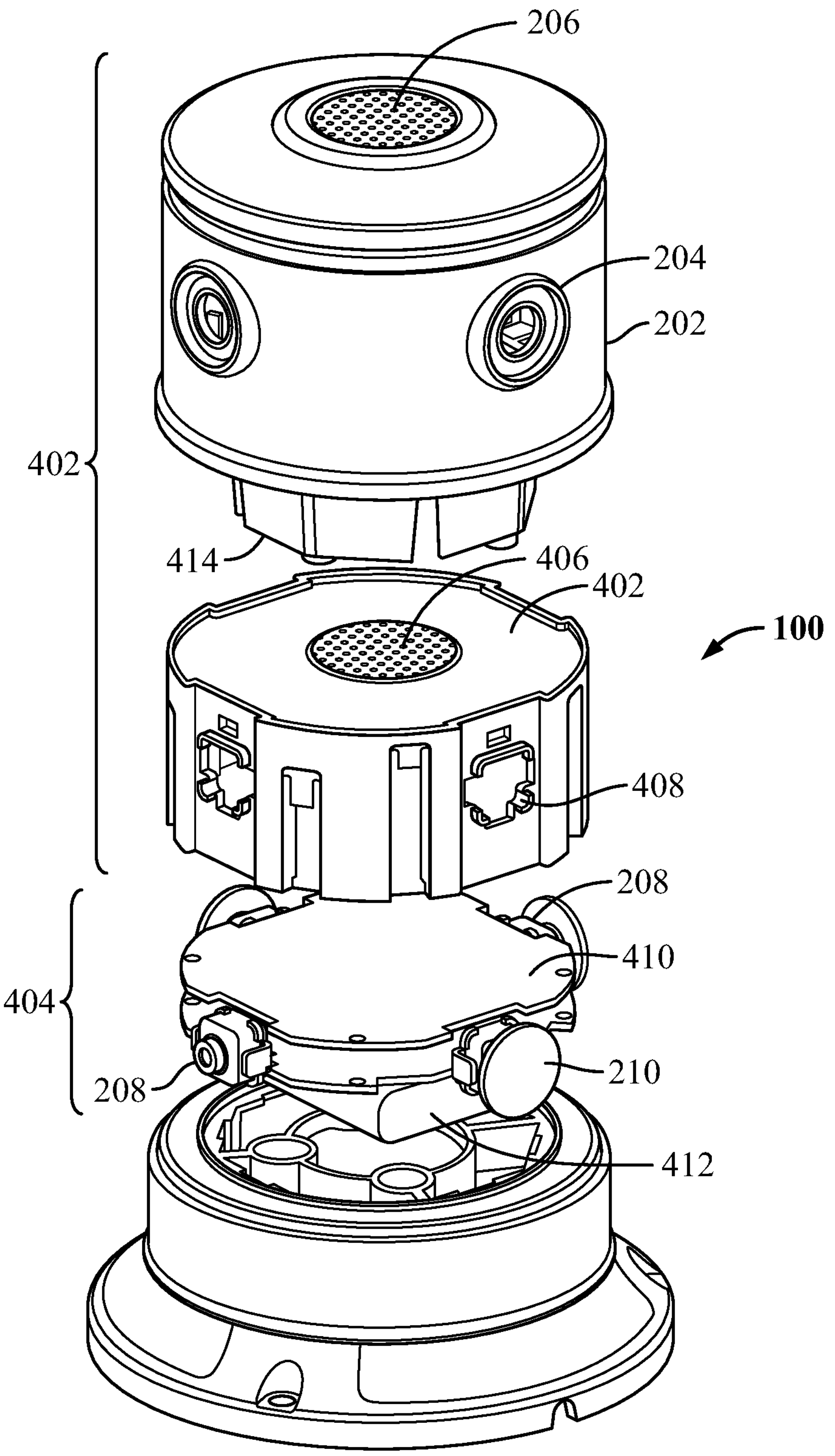
FIG. 4 shows a second semi-exploded view of the multifunctional strobe light.
Figure 5:
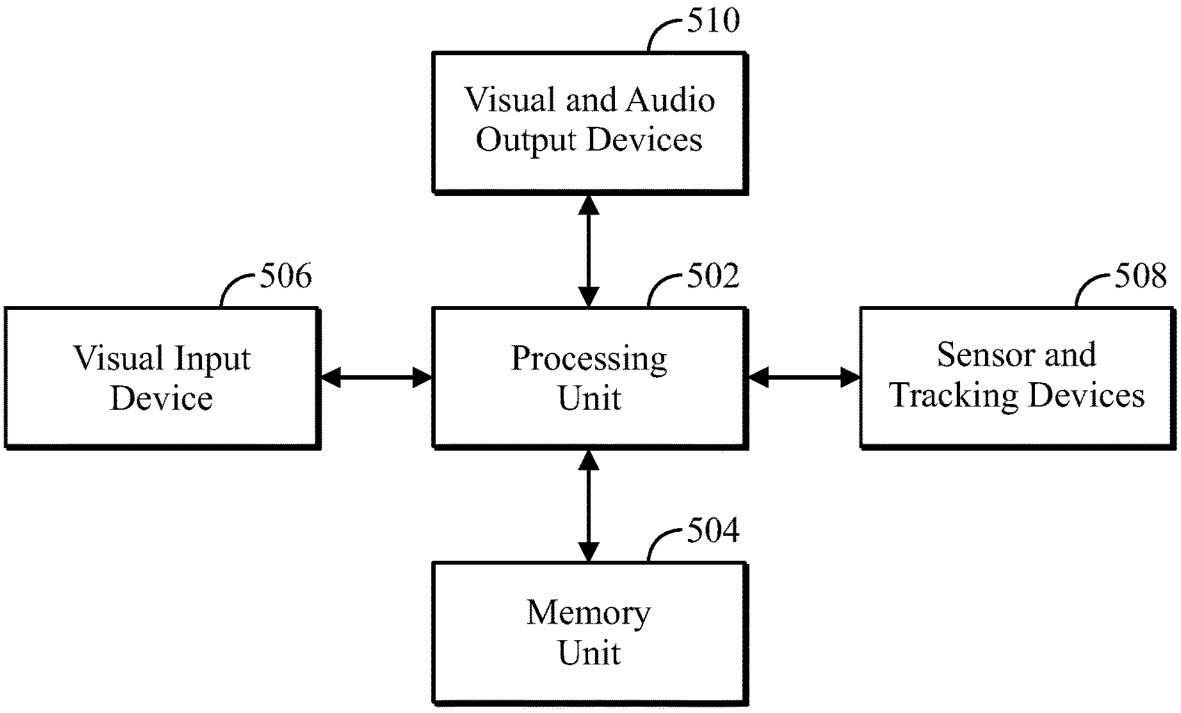
FIG. 5 shows a block diagram of some of the electrical components of the multifunctional strobe light and their relationship with each other.
Figure 6:
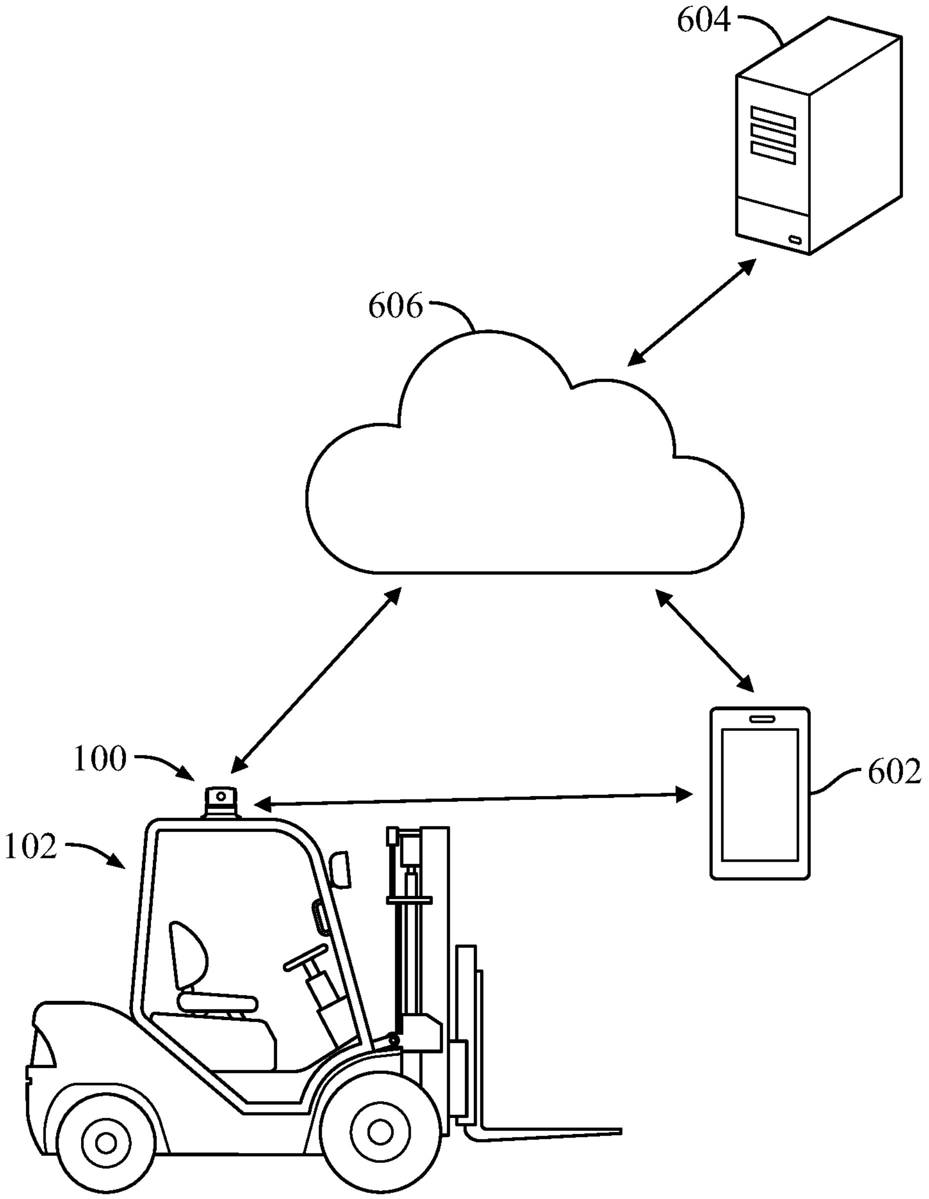
FIG. 6 shows a diagram of the multifunctional strobe light in connection with a server and a mobile device of the driver.

Referring now to the figures, a multifunctional strobe light 100 that may be used with a forklift 102, and related methods, are disclosed. As shown in FIG. 1, the multifunctional strobe light 100 may be mounted on a portion of the forklift 102 where the cameras of the device have the necessary view of the surrounding environment to video record and determine if an object is about to collide with the forklift. As shown in FIG. 2, the multifunctional strobe light 100 may have one or more cameras 208 around its outer housing 202 and speaker holes 206 to transmit audio signals in addition to the visual signals of the strobe light mechanism 212. As shown in FIG. 3, the strobe light mechanism 212 may have a plurality of LED lights 302 surrounding the multifunctional strobe light 100 that are covered by one or more strobe light transparent lenses 214, 306. As shown in FIG. 4, the multifunctional strobe light 100 may have additional electrical components 404 designed to provide additional functions to the strobe light, some of such functions would be determining nearby objects and providing audio and visual warning signs if a collision is about to take place. As shown in FIG. 5, the different electrical components that may be responsible for the generation of the additional functions of the multifunctional strobe light 100 is shown. As shown in FIG. 6, the multifunctional strobe light 100 may be connected to a server 604 via a network 606 and also to a mobile device 602 of the operator.

In additional to providing a warning signal of the operation of the forklift 102 to the forklift operator and others in the surrounding area, the multifunctional strobe light 100 may have additional functions that may be beneficial to the operator, the owner of the forklift, and the surrounding people and environment. Such additional functions may include real-time video recording that may be stored and sent to a server, providing pre-collision warning signals to the operator, collision detection, GPS, time, and operator tracking, and ensuring the operator has completed pre-requisite tasks before operating the forklift 102, just to name a few functions. Since all the components to achieve the aforementioned features are integrated with the multifunctional strobe light 100, a user does not need to figure out where to install cameras, sensors, and devices on the forklift 102 to achieve the functions that the multifunctional strobe light 100 provides. Some or all of the additional functions may be done by artificial intelligence incorporated with the multifunctional strobe light 100.

Referring specifically now to FIGS. 1, a side view of a forklift 102 having a multifunctional strobe light 100 is shown. By way of example and not limitation, the forklift 102 may be any type of forklift, such as a warehouse forklift, a counterbalance forklift, a heavy-duty forklift, a rough terrain forklift, or a side loader forklift. Although the multifunctional strobe light 100 is shown attached to a forklift, other vehicles that may need the usage of a strobe light, such as emergency vehicles, may also use the multifunctional strobe light 100.

The forklift 102 may have a lifting mechanism 104 with forks 106 extending forward in front of the forklift 102. The forklift 102 may have a rear body section 108 that may have a counterweight incorporated. The forklift 102 may have an operator cab 110 between the forklift mechanism 104 and the rear body section 108 of the forklift 102. The operator cab 110 may be where the operator sits and operates the forklift 102. There may exist a cab frame 112 over the operator cab 110 that surrounds the operator while using the fork lift 102. The cab frame 112 may have a roof 112*a* (i.e., overhead guard) between a left and right frame edges (not shown) of the cab frame 112. The cab frame 112 may have a rear frame edge 112*b* and a front frame edge 112*c* that the roof 112*a* is in between.

By way of example and not limitation, the multifunctional strobe light 100 may be mounted on a portion of the cab frame 112. By way of example and not limitation, the multifunctional strobe light 100 may be mounted to the roof 112*a* of the cab frame 112. The multifunctional strobe light 100 may be mounted in the middle of the roof 112*a*, a front portion of the roof 112*a* near the front frame edge 112*c*, or a rear portion of the roof 112*a* near the rear frame edge 112*b*. As such, the multifunctional strobe light 100 may have a 360-degree view of the surrounding of the forklift 102 and take panoramic video recording. By way of example and not limitation, the cameras 208 (see FIG. 2) of the multifunctional strobe light 100 may be pointing downwards to have a better view of the surrounding ground of the forklift 102. Since the multifunctional strobe light 100 have the cameras 208 for video recording on its body, as user may not have to go through the hassle of figuring out where to install different cameras on different parts of the forklift 102. Since the multifunctional strobe light 100 is designed to be switched with a conventional strobe light of the forklift 102, which is at a visible position where others can see the lighting produced by the strobe light, the cameras 208 may have full visibility (360-degree visibility) of the surrounding environment, or at least semi-full visibility (i.e., between 180 to 300-degree visibility of the front or rear of the forklift 102). By way of example and not limitation, the multifunctional strobe light 100 may be attached to the rear frame 112*b*, front frame 112*c*, or left or right frames of the forklift 102 depending on how much visibility of the surrounding area the cameras of the multifunctional strobe light 100 require. By way of example and not limitation, the multifunctional strobe light 100 may be attached to the rear body section 108 of the forklift 102.

The installing of the multifunctional strobe light 100 may be simple and convenient since such device may have similar, or the same, wire connection and mounting features as the original strobe light of the forklift 102. By way of example and not limitation, if the original strobe light is hard-wired to the forklift 102, the original strobe light may simply be dismounted from the mounting interface on the forklift 102 and disconnected from the wiring so that the multifunctional strobe light 100 may be connected to the wiring connection and mounted to the mounting interface. The multifunctional strobe light 100 may be designed to be attached to the mounting interface of a conventional strobe light that is originally mounted to the forklift 102. By way of example and not limitation, if the forklift 102 originally has no strobe light, or the strobe light is not connected to the battery of the forklift 102 by hardwire, the multifunctional strobe light 100 may be mounted to the forklift 102 nevertheless and be operational since the multifunctional strobe light may have a rechargeable battery, as described elsewhere herein.

Referring now to FIG. 2, a perspective view of the multifunctional strobe light 100 is shown. The multifunctional strobe light 100 may have an outer housing 202 attached to a strobe light mechanism 212 that is attached to a mounting interface 216. By way of example and not limitation, the outer housing 202 that houses the electrical components of the additional features of the multifunctional strobe light 100 may be positioned on top of the strobe light mechanism 212. The body of the strobe light mechanism 212 may be the part attached to the mounting interface 216. Alternatively, the positions of the outer housing 202 and the strobe light mechanism 212 may be reversed, where the strobe light mechanism 212 may be on top of the outer housing 202 and the outer housing 202 may be attached to the mounting interface 216. The position of the outer housing 202 relative to the strobe light mechanism 212 may depend on the optimizing of the camera angles and the needed heigh for the cameras 208 to have sufficient view of the surrounding environment of the forklift. By way of example and not limitation, the shape of the multifunctional strobe light 100 may be cylindrical, cubical, or conical.

By way of example and not limitation, the shape of the outer housing 202 may be cylindrical, cubical, or conical. The outer housing 202 may have one or more camera apertures 204 on the front, back, left, and right sides of its body. By way of example and not limitations, the outer housing 202 may have between one or more camera apertures (e.g., one to eight camera apertures) 204. In a preferred example, the outer housing 202 may have four camera apertures 204, one on the front, back, left and right sides of its body. The outer housing 202 may also have speaker holes 206 to help relay sound created by speakers within the multifunctional strobe light 100. By way of example and not limitation, the speaker holes 206 may be on a top surface of outer housing 202. By way of example and not limitation, the speaker holes 206 may be on the cylindrical surface of the outer housing 202.

The multifunctional strobe light 100 may have one or more cameras 208 inside the outer housing 202 and facing their lenses at the camera aperture 204 openings and to the outside environment. Consequently, the number and orientation of cameras 208 relative to the outer housing 202 may be the same as the as the camera apertures 204. By way of example and not limitation, there may be cameras 208 on the front, back, left, and right side of the outer housing 202. By way of example and not limitation, there may exist between one to eight cameras 208. By way of example and not limitation, the cameras 208 may be similar to the cameras used on the outside of automobiles for recording and detection of the surrounding environment. By way of example and not limitation, the cameras may have fisheye lenses. By way of example and not limitation, the video recording of each camera 208 may be combined together to have a panoramic (i.e., 360-degree) video recording of the surrounding environment of the forklift. Alternatively, if only one or two cameras 208 are used with the multifunctional strobe light 100, the video recordings may be combined together to have between 180 to 300-degree video recording of the surrounding environment. By way of example and not limitation, there may exist outside cover lenses 210 within each camera aperture 204 to cover the lenses of the camera 208. The outside cover lenses 210 may be placed in front of each camera 208 to cover and protect the camera lens from the outside environment while also allowing the cameras 208 to video record. By way of example and not limitation, the outside cover lenses 210 may be transparent lenses or one-way glass lenses.

The strobe light mechanism 212 may create light patterns, such as light circling the strobe light, flashing light, or a constant light. The strobe light mechanism 212 may produce different color lights. As shown in FIG. 2, the strobe light mechanism 212 may have an outer strobe light transparent lens 214 that may be transparent or have a hue of a color, such as the color orange. More detail about the strobe light mechanism 212 will be discussed elsewhere herein, specifically with FIG. 3.

The mounting interface 216 may be used to mount the multifunctional strobe light 100 to the forklift 102 (see FIG. 1), preferably to the roof 112*a* of the forklift 102. By way of example and not limitation, the mounting interface 216 may be similar, or the same, as a mounting interface of a conventional strobe light in order to create ease of installation of the multifunctional strobe light 100. The mounting interface 216 may have similar structural dimensions and even fastening holes 218 to remove the original strobe light and install the multifunctional strobe light 100.

With reference to FIG. 3, and by way of example and not limitation, the removal of original strobe light may be done by a twisting force that detaches the component via an interlocking mechanism 308 on the mounting interface 216. The attachment of multifunctional strobe light 100 may be done by a reverse twisting force that locks the interlocking mechanism 308 between the mounting interface 216 and the strobe light. Alternatively, the fastening holes 218 may be used to detach the mounting interface 216 along with original strobe light from forklift. This may be done to access the bottom surface of the mounting interface 216 to detach the original strobe light from the interface and mount the multifunctional strobe light 100. Alternatively, the mounting interface 216 may be designed to work only with the multifunctional strobe light 100 and similar devices. The mounting interface 216 may be mounted on different parts of the forklift to allow the mounting of the multifunctional strobe light 100 on different parts of the forklift. The mounting locations of the multifunctional strobe light 100 and the mounting interface 216 may be as described elsewhere herein with respect to the position of the multifunctional strobe light 100, specifically with respect to FIG. 1. In a preferred example, the mounting interface 216 and the multifunctional strobe light 100 may be mounted on the roof 112*a* of the forklift 102 (see FIG. 1), specifically the center of the roof.

Referring again to FIG. 3, a first semi-exploded view of the multifunctional strobe light 100 showing the different components of the strobe light mechanism 212 is shown. The strobe light mechanism 212 may produce lighting and lighting patterns by the usage of a plurality of LED lights 302. By way of example and not limitation, the plurality of LED lights 302 may be compartmentalized in different LED modules 304. Each LED module 304 may have a plurality of LED lights 302 orientated in a line next to each other. By way of example and not limitation, each LED module 304 may have between 2-18 LED lights 302. By way of example and not limitation, the LED lights 302 of the LED modules 304 may create light patterns, such as light circling the strobe light, flashing light, or a light constantly on. The circling light pattern may be created by the LED lights 302 turning on and off consecutively such that a first LED light 302 turns on and then turns off when the LED light 302 next to the first LED light 302 turns on. More than one LED may be turn on and off to create the circling pattern, or consecutive LED modules 304 may turn on and off. To create a flashing light pattern, all or some of the LED lights 302 may turn on and off together. Alternatively, the flashing light pattern may be created by all or some of the LED modules 304 turning on and off. By way of example and not limitation, the LED lights 302 may produce white light or different colored lights on the ROYGBV spectrum.

The strobe light mechanism 212 may have an outer strobe light lens 214 and an inner strobe light lens 306. By way of example and not limitation, the outer strobe light lens 214 may be made of a transparent polymer or glass material and have a hue of color, such as a shade of orange or red. The outer surfaces of the outer strobe light lens 214 may be smooth. By way of example and not limitation, the inner strobe light lens 306 may be made of a transparent polymer or glass material and have a hue of color, such as a shade of orange or red. The outer surface of the inner strobe light lens 306 may have ribbed patterns. The outer and inner strobe light lenses 214, 306 may help project and amplify the light produced by the LED lights 302 of the LED modules 304. By way of example and not limitation, the inner strobe light lens 306 may fit inside the outer strobe light lens 214, and the outer strobe light lens 214 is attached to the mounting interface 216.

Referring now to FIG. 4, a second semi-exploded view of the multifunctional strobe light 100 showing the additional electrical components 404 that are responsible for the additional functions is shown. The additional electrical components 404 may be housed in the housing components 402 that includes the outer housing 202 and the inner housing 402. The outer housing 202 may have the same features as described elsewhere herein. Additionally, and by way of example and not limitation, the outer housing 202 may have a plurality of protruding rims 416 at its inner bottom edges that are designed to interlock with the inner housing 402 and/or the strobe light mechanism 212 (see FIG. 3). The inner housing 402 may be designed to fit within the outer housing 202 and have an inner volume to store the additional electrical components 404. By way of example and not limitation, the inner housing 402 may have a second set of speaker holes 206 that align with the speaker holes of the outer housing 202. The inner housing 402 may also have one or more camera storage areas 408 where the cameras 208 are mounted within, and the camera storage areas 408 are designed to align with the camera apertures 205 of the outer housing 202.

The additional electrical components 404 may add additional safety, video recording, and tracking features in addition to the strobe light mechanism 212, as explained elsewhere herein. By way of example and not limitation, some or all the additional electrical components 404 may be connected to one or more printed circuit boards 410. The additional electrical components may be connected directly or indirectly to a processing unit 502 (see FIG. 5) that is on a printed circuit board 410 housed in the inner housing 402. By way of example and not limitation, the processing unit 502 may be one or more processors. By way of example and not limitation, the processing unit 502 may be part of a controller.

With reference with FIG. 5, the processing unit 502 may compute and execute the additional functions of the multifunctional strobe light 100 by executing and processing software. The processing unit 502 may be connected to a memory unit 504 (see FIG. 5) to retrieve software information for computation and execution of functions and store information acquired by visual input devices 506 and sensor and tracking devices 508. By way of example and not limitation, the memory unit 504 may include random access memory and read-only memory for retrieving and executing programming by the processing unit 502, and a memory unit for storing video recordings of the cameras 208. By way of example and not limitation, the processing unit 502 in conjunction with the memory unit 504, the visual input devices 506, and the sensor and tracking devices 508 may be used for functions of detecting objects near the forklift, detecting pre-collision, and triggering recording and alerts, which some or all of these functions may be done by artificial intelligence incorporated with the multifunctional strobe light.

Referring back to FIG. 4, the additional electrical components 404 may include cameras 208 that were described elsewhere herein. With reference to FIG. 5, the cameras 208 may be the visual input devices 506 that are connected to the processing unit 502. The additional electrical components 404 shown in FIG. 4 may also include a speaker designed to transmit an audible warning alert if the forklift is about to get into a collision or the operator of the forklift is doing something wrong, in general. By way of example and not limitation, the speaker along with the strobe light mechanism 212 (see FIG. 3) may define the visual and audio output devices 510 shown in the block diagram of FIG. 5. With reference to FIG. 5 in addition to FIG. 4, the additional electrical components 404 may include a plurality of sensor and tracking devices 508 that are connected directly or indirectly to the processing unit 502 via the one or more printed circuit boards 410. By way of example and not limitation, the sensors may include a shock sensor, an accelerometer, and a proximity sensor. By way of example and not limitation, the tracking devices may include a GPS device and a time tracker. By way of example and not limitation, the additional electrical components 404 shown in FIG. 4 may include a Wi-Fi capability, in the form of a Wi-Fi antenna, to connect to a server and send and receive data, as further described with FIG. 6. As shown in FIG. 4, and by way of example and not limitation, the additional electrical components 404 may include a rechargeable battery 412 to power the device when the forklift is not on. Additionally, the rechargeable battery 412 may act as the power source of the multifunctional strobe light 100 if hardwiring is not used between the forklift and the strobe light.

Referring now to FIG. 5, a block diagram of some of the electrical components of the multifunctional strobe light 100 that are responsible for executing the additional functions is shown. The additional functions include video recording the surrounding environment of the forklift, tracking data pertaining to the operation of the forklift, collision detection, providing collision warning, determining if a collision has taken place, and recording the pertinent data. Additionally, the multifunctional strobe light 100 may determine if the operator of the forklift has completed pre-requisite tasks prior to operating the forklift and provide warning if such tasks were not completed.

The visual input devices 506 that correspond to the cameras 208 shown in FIG. 4 may video record the surrounding environment while the forklift is in operation and in motion. By way of example and not limitation, the video recording of the visual input devices 506 may be combined to create a panoramic and 360-degree recording around the forklift. Alternatively, the video recording of the visual input devices 506 may be combined to create a panoramic recording between 180 to 300-degree of either the front view or the rear view of the forklift. By way of example and not limitation, the video recording may be transferred to the memory unit 504 and stored there, which the video recording may later be transferred to a server using a Wi-Fi connection. By way of example and not limitation, the processing unit 502 may analyze the real-time video footage and, using the software programming stored in the memory unit 504, determine the types of objects that are near the forklift. By way of example and not limitation, the processing unit 502 may use the video recording to determine whether an object near the forklift is a person, a rack, a crate, a box, another forklift, etc. The real-time video recording may be used to determine all the objects surrounding the forklift within a certain radial distance from the multifunctional strobe light 100. By way of example and not limitation, the processing unit 502 may use the real-time video recording to calculate the distance between objects and the forklift and/or the multifunctional strobe light 100, as described elsewhere herein. Such calculation may be used trigger collision warnings. By way of example and not limitation, the determination of the type of object around the forklift and the calculation of the distance of the object from the forklift may utilize artificial intelligence by the processing unit 502. The distance may also be calculated using stereo vision based on the 2 dimensional pictures of the objects using the one or more cameras around the forklift. As described elsewhere herein, the multifunctional strobe light 100 may be positioned at a location on the forklift that the visual input devices 506 have the necessary view of the surrounding for video recording.

The sensor and tracking devices 508 may include GPS and time tracking devices that may record tracking data in conjunction with the video recording of the visual input devices 506. By way of example and not limitation, the GPS and time tracking may be done while the forklift is in operation and the video recording is going on. The GPS tracking may trace the location of the forklift, for instance on the factory floor. By way of example and not limitation, the GPS tracking may be stored in the memory unit 504 and processed by the processing unit 502 to provide detail of the location of the forklift at different time intervals in the video recording. The GPS tracking may be incognito to the operator of the forklift and help the owner of the forklift track the location of the vehicle. By way of example and not limitation, a time tracker device may be implemented to record the time of the day of when a particular video footage was taken in addition to the GPS location of the video footage. The identification of the driver may also be tracked by the multifunctional strobe light 100 based on digitizing a required questionnaire that the operator needs to answer using the operator's smartphone, as explained elsewhere herein.

The processing unit 502 may compile the video recording, GPS tracking, and time tracking and store in memory unit 504 a detailed recording of what visually occurred around the forklift, the exact location of the occurrences, and the time of the day. The combination of the aforementioned data and information may be important when the multifunctional strobe light 100 detects that the forklift is about to be or has been in a collision. By way of example and not limitation, the real-time video recording, GPS tracking, and time tracking may be triggered to be stored in the memory unit 504 when pre-collision of the forklift has been determined by the processing unit 502.

The processing unit 502 may use the video recording of the visual input devices 506 to calculate the distance between a nearby object and the multifunctional strobe light 100 and/or the forklift. For example, the processor may use stereo vision to calculate the distance. After calculating such distance, the processing unit 502 may direct the visual and audio output devices 510 to trigger pre-collision warnings if the calculated distance is less than a threshold distance. The visual and audio output devices 510 may be the strobe light mechanism 212 shown in FIG. 3 and the speaker described with respect to FIG. 4. By way of example and not limitation, the processing unit 502 may store in the memory unit 504 the video recording of the visual input devices 506 and the data collected by the sensors and the tracking devices 508 during the outputting of pre-collision warnings, and during and after the actual collision, if one takes place. A collision may be detected by the multifunctional strobe light 100 using shock and accelerometer sensors of the sensors and tracking devices 508 and the calculated distance of the object relative to the multifunctional strobe light 100 and/or the forklift. The calculation of distance may be done by the processing unit 502 using the real-time video recordings of the visual input devices 506 and/or by stereo vision. By way of example and not limitation, the time and location of when a collision has occurred, or a pre-collision alert has occurred, may also be recorded and stored in the memory unit 504. The data of video recording, location and time tracking, and data collected by the sensors during pre-collision, actual collision, and after the collision, may be transferred to a server, as explained elsewhere herein and with FIG. 6. By way of example and not limitation, one or more proximity sensors that are part of the sensor and tracking devices 508 may be used in conjunction, or in substitution, of the real-time video recording and other sensors to determine pre-collision and collision of the forklift.

Using the real-time video recording of the visual input devices 506 and the software programming in the memory unit 504, the processing unit 502 may determine that an object near the forklift has reached a threshold distance that is too close to the forklift. The threshold distance may be calculated from the multifunctional strobe light 100 or the outer perimeter of the forklift. By way of example and not limitation, the processing unit 502 may use artificial intelligence in calculating the threshold distance or stereo vision. By way of example and not limitation, the threshold distance may be measured from the video recordings of one or more of the cameras 208 (see FIG. 4) around the multifunctional strobe light 100. As such the threshold distance may be a radial distance around the strobe light and/or the forklift that may get triggered when an objects passes inside the circle created by such radial distance. Consequently, the threshold distance may also be seen as a threshold boundary around the forklift that a pre-collision warning would be generated if an object passes through the boundary.

If an object is closer to the strobe light/forklift less than the threshold distance/boundary, the processing unit 502 may direct the visual and audio output devices 506 on the strobe light to output warning signals to alert the operator about a possible collision. By way of example and not limitation, the audio output device (i.e., the speaker connected to speaker holes 206, 406 in FIG. 4) may output a beeping sound or a siren sound in a specific pattern that would put the operator of the forklift on alert. Alternatively, the audio output device may output an automated voice alert in the form of verbal words, for example "warning" or "caution" in a loud automated voice. By way of example and not limitation, the audio warning may specify in the warning alert the type of object that the forklift is about to hit since the multifunctional strobe light 100 may be configured to detect the type of object that the forklift may collide with. The visual pre-collision warning sign may be in the form of flashing lights and a change in the color of the light of the strobe light mechanism 212 (see FIG. 3). By way of example and not limitation, the light of the strobe light mechanism 212 may flash with a different color than the default color instead of circling around the multifunctional strobe light 100. Alternatively, the light of the strobe light mechanism 212 may circle in different color rather than flashing, or the light may change color and stay constantly on without circling the strobe light.

In addition to the triggering of the pre-collision warnings, the processing unit 502 may also direct the saving of the real-time video recording at a time interval before and during the pre-collision warnings and also during the collision, if one takes place. By way of example and not limitation, the video recording may be stored in the memory unit 504 between 5 to 360 seconds before and after the pre-collision or the collision itself. By way of example and not limitation, the time, location, and the identity of the operator and item to be collided may also be stored in the memory unit 504 during the output of pre-collision warnings and/or the collision itself. Such data and the video recording may later be transferred to a server, as explained elsewhere herein. Such data may be stored as evidence of the incidence that took place to assess who was liable and if the operator of the forklift was negligent or reckless.

By way of example and not limitation, the sensors of the sensor and tracking devices 508 may be used in conjunction with the video recording of the visual input devices 506 to determine collision. A collision between the forklift and an object may occur if the pre-collision warning did not put the operator on notice or a pre-collision warning output could not be sent out because the collision happened very quickly. By way of example and not limitation, the sensors that determine a collision may be constantly active or may become active when a pre-collision state is determined by the processing unit 502 (i.e., the object passes through a threshold boundary/distance). By way of example and not limitation, the sensors that determine collision may be a shock sensor and/or an accelerometer. The shock sensor may determine whether a physical shock or impact has occurred to the forklift. The accelerometer sensor may measure the change in acceleration of the forklift, such as an abrupt deceleration. If the pre-collision warnings did not alert the operator in time and the forklift collides, the shock sensor and the accelerometer may sense the impact and change in acceleration and send data to the processing unit 502 to determine that a collision has occurred. By way of example and not limitation, the processing unit 502 may use the data collected by the shock sensor about the collision to measure the magnitude of the impact that the forklift felt and record such data in the memory unit 504. By way of example and not limitation, the processing unit 502 may use the data collected by the accelerometer regarding the collision to measure the change in acceleration resulted from the collision and record such data in the memory unit 504. Such saved data about the measurement of the impact and change in acceleration may then be transmitted to a server and be analyzed to assess who was liable and if the operator of the forklift was negligent or reckless. By way of example and not limitation, one or more proximity sensors that are part of the sensor and tracking devices 508 may be used in conjunction, or in substitution, of the real-time video recording and other sensors to determine pre-collision and collision of the forklift.

Referring now to FIG. 6, a diagram of the multifunctional strobe light 100 in connection with a server 604 and a mobile device 602 of the operator of the forklift 102 is shown. The data captured by the multifunctional strobe light 100 may be transferred to a server 604. The multifunctional strobe light 100 may be connected to the server 604 by a network 606. By way of example and not limitation, the network 606 may include one, some, or all of cellular communications networks, data communications networks, and/or the Internet. By way of example and not limitation, the data transferred to the server 604 by the multifunctional strobe light 100 may be the real-time video recording, location, and time pertaining to the video recorded footage, as describe elsewhere herein. The transmitted video recording may be of of an interval of time where a pre-collision warning and/or a collision took place, or alternatively any other video recording interval that needs to be transmitted to the server 606. The identity of the operator of the forklift 102 and the collided object, or the object that may have been collided, may also be sent to the server 604. If a collision took place, then the magnitude of impact and the change in acceleration measured by the sensors of the multifunctional strobe light 100 may also be sent. If a collision occurred, the multifunctional strobe light 100 may also send to the server 604 whether a pre-collision warning signal was generated by the strobe light or whether the collision happened so quickly that a pre-collisional warning signal could not be generated. Ultimately, the multifunctional strobe light 100 may transmit data to the server 604 of who (identification of the operator), what (identification of the colliding object), when (time tracker), where (GPS tracker), why (video recording), and how (data collected from shock sensor and accelerometer) pertaining to a pre-collision or a collision that the forklift 102 faced.

As shown in FIG. 6, an operator's mobile device 602 may be connected to the multifunctional strobe light 100 to transmit data about completing pre-requisite tasks and forms required prior to operating the forklift 102. Government agencies on the state and federal level, such as the Occupational Safety and Health Administration, may require the operator of the forklift 102 to complete a pre-requisite questionnaire and a to-do list before operating the forklift 102, and also keep track of the identity of the operators who operate the forklift 102. After completing such questionnaire and to-do list, the operator may need to sign and attest that what has been recorded is accurate. By way of example and not limitation, such questionnaire and to-do list may be digitized and completed using an app on the operator's mobile device 602, which may be a smartphone. When the questionnaire and to-do list is completed on the smartphone 602, the smartphone may transmit to the multifunctional strobe light 100 the completion of such tasks, and also give the identity of the operator who completed the to-do list and questionnaire. By way of example and not limitation, the transmission of such information to the multifunctional strobe light 100 may be required for the strobe light not to emit warning signals that such pre-requisite questionnaire and to-do list was not completed by the driver. If the multifunctional strobe light 100 does not receive an indication that the operator has not completed the questionnaire and to-do list, the strobe light may emit visual and audible warning signals that the driver has not completed such tasks required before operating the forklift 102. By way of example and not limitation, the visual warning signals may be in the form of flashing light from the strobe light mechanism 212 (see FIG. 3). By way of example and not limitation, the visual warning signals may be done in a different color than the normal color projected by the strobe light mechanism 212. By way of example and not limitation, the audio warning signal may be in the form of beeping, a siren, or an automated verbal voice that explicitly indicates that the driver has not completed the check-list and to-do list.

By way of example and not limitation, the smartphone 602 may be connected to the multifunctional strobe light 100 using a Bluetooth technology or WI-FI. By way of example and not limitation, the answers to the questionnaire and to-do list, in addition to the identity of the operator completing such tasks, may be transferred and archived to the server 604 via the network 606, either directly from the smartphone 602 or through the multifunctional strobe light 100. By way of example and not limitation, the multifunctional strobe light 100 may be connected to a relay switch to the ignition of the forklift 102, where if the operator does not complete the pre-requisite questionnaire and checklist on the app of the mobile device 602, the forklift 102 will not turn on.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A multifunctional strobe light, comprising:

a strobe light mechanism having a strobe light lens covering a plurality of LED lights on the multifunctional strobe light;

a housing body attached to the strobe light mechanism for housing electrical components, the housing body having a first camera aperture; and the electrical components including a printed circuit board with a processor and a memory unit in electrical communication with the printed circuit board, a first camera facing the camera aperture and a speaker device electrically connected to the processor;

wherein the housing body has a second camera aperture, and the electrical components further include a second camera facing a second camera aperture.

2. A multifunctional strobe light comprising, a strobe light mechanism having a strobe light lens covering a plurality of LED lights on the multifunctional strobe light;

a housing body attached to the strobe light mechanism for housing electrical components, the housing body having a first camera aperture; and the electrical components including a printed circuit board with a processor and a memory unit in electrical communication with the printed circuit board, a first camera facing the camera aperture and a speaker device electrically connected to the processor;

a second camera, a front camera, and a rear camera configured to panoramically video record a surrounding environment of the multifunctional strobe light.

3. A multifunctional strobe light, comprising:

a strobe light mechanism having a strobe light lens covering a plurality of LED lights on the multifunctional strobe light;

a housing body attached to the strobe light mechanism for housing electrical components, the housing body having a first camera aperture; and the electrical components including a printed circuit board with a processor and a memory unit in electrical communication with the printed circuit board, a first camera facing the camera aperture and a speaker device electrically connected to the processor;

wherein the multifunctional strobe light has a Wi-Fi antenna within the housing body to access a server and archive video recordings of a front camera and a rear camera.

4. A multifunctional strobe light, comprising:

a strobe light mechanism having a strobe light lens covering a plurality of LED lights on the multifunctional strobe light;

a housing body attached to the strobe light mechanism for housing electrical components, the housing body having a first camera aperture; and the electrical components including a printed circuit board with a processor and a memory unit in electrical communication with the printed circuit board, a first camera facing the camera aperture and a speaker device electrically connected to the processor;

wherein the processor is configured to determine a distance of an object from the multifunctional strobe light using stereo vision.

5. The multifunctional strobe light of claim 4, wherein the processor is configured to control the speaker device to output a warning sound when the object passes a threshold distance measured relative to the multifunctional strobe light.

6. A method of providing pre-collision warnings using a multifunctional strobe light of a forklift, comprising:

real-time recording a surrounding environment using one or more cameras of the multifunctional strobe light;

processing the real-time recording of the one or more cameras to recognize a nearby object and determine a distance of the nearby object relative to the multifunctional strobe light using a processing unit of the multifunctional strobe light;

determining whether the distance of the nearby object is less than a threshold distance that is indicative of a possible collision using the processing unit of the multifunctional strobe light; and if the distance of the nearby object is less than the threshold distance, generating one or more warning signals using the multifunctional strobe light that alerts a driver of the forklift.

7. The method of claim 6, wherein the one or more warning signals is an audible sound produced by the multifunctional strobe light.

8. The method of claim 7, wherein the one or more warning signals is also a change in a lighting pattern of the multifunctional strobe light.

9. The method of claim 6, wherein the real-time recording of the one or more cameras is stored in a memory unit of the multifunctional strobe light.

10. The method of claim 6, wherein the real-time recording of the one or more cameras is stored in a memory unit of the multifunctional strobe light when the distance of the nearby object becomes less than the threshold distance.

11. The method of claim 6, further comprising tracking a location of the forklift using a GPS tracking device of the multifunctional strobe light.

12. The method of claim 6, further comprising determining whether an impact has occurred using a shock sensor of the multifunctional strobe light that is electrically coupled to a processor.

13. The method of claim 6, further comprising determining whether an impact has occurred using a accelerometer of the multifunctional strobe light that is electrically coupled to a processor.

14. The method of claim 6, wherein recognizing the nearby object by a processor determines a type of object that the nearby object falls under.

15. The method of claim 6, wherein the multifunctional strobe light is attached to a roof of a cab frame of the forklift.

* * * * *